United States Patent
Lu et al.

(10) Patent No.: US 7,743,424 B2
(45) Date of Patent: Jun. 22, 2010

(54) METHOD FOR PROTECTING DATA IN A HARD DISK

(75) Inventors: Ying-Chih Lu, Taipei (TW); Ling-Hung Yu, Taipei (TW)

(73) Assignee: Inventec Corporation, Taipei (TW)

( * ) Notice: Subject to any disclaimer, the term of this patent is extended or adjusted under 35 U.S.C. 154(b) by 788 days.

(21) Appl. No.: 11/709,216

(22) Filed: Feb. 22, 2007

(65) Prior Publication Data

US 2008/0209553 A1 Aug. 28, 2008

(51) Int. Cl.
*H04L 9/32* (2006.01)
(52) U.S. Cl. .............................. 726/26; 726/27; 726/30
(58) Field of Classification Search .................. 713/1–2, 713/168, 189–190, 192–194; 726/26, 30, 726/27; 369/47.1, 272.1; 711/100, 129, 711/151, 162–164
See application file for complete search history.

(56) References Cited

U.S. PATENT DOCUMENTS 6,052,781 A * 4/2000 Weber .......................... 726/22
6,061,788 A * 5/2000 Reynaud et al. ................. 713/2

* cited by examiner

*Primary Examiner*—Hosuk Song
(74) *Attorney, Agent, or Firm*—Bacon & Thomas, PLLC (57) ABSTRACT

The present invention discloses a method for protecting data in a hard disk, such that when a computer executes a power-on self test (POST) of a basic input/output system (BIOS), completes initialization of memories and calls an interrupt routine of the BIOS to read a hard disk area after initialization program codes of interface devices of all hard disk are executed, the computer will determine whether or not the hard disk has added a protection description data with a portion that matches with a computer identification code of the computer before accessing data in the hard disk.

17 Claims, 7 Drawing Sheets

METHOD FOR PROTECTING DATA IN A HARD DISK

FIELD OF THE INVENTION

The present invention relates to a method for protecting data in a hard disk, and more particularly to a method of protecting data in a hard disk of a computer, and the computer determines whether or not the hard disk has a protection description data that matches with a computer identification code of the computer before allowing or preventing the computer to access data in the hard disk.

BACKGROUND OF THE INVENTION

As computer (including a desktop computer, a notebook computer or a server) generally installs at least one hard disk, and each hard disk includes a master boot sector (which is the sector with Cylinder 0, Head 0, Sector 1 of a hard disk as specified by the computer industrial standard, and also is the forefront sector of the hard disk). The master boot sector stores a master boot record (MBR), and the master boot record includes a jump area at a start position of the MBR boot code area and a MBR boot code area of a boot code sequentially for specifying and reading a hard disk, a partition table area for storing each disk partition table, and an end area (represented by two bytes AA 55) for identifying the end of the master boot sector. If the hard disk is set as a master hard disk for starting an operating system, then the operating system will be started according to the contents of the master boot record, and thus the computer can store data into the hard disk after the operating system is started.

However, computers are stolen quite often, and the loss involved is usually much higher than the value of the computer itself, since the important and confidential data stored in the hard disk may be disclosed. Particularly for corporate users, the loss or disclosure of data in the hard disk to a competitor may create a big trouble to the company. In view of the aforementioned issue, system manufacturers developed a data protection method for protecting the data in a hard disk and preventing disclosure of confidential data stored in the hard disk.

In the foregoing data protection method for hard disks, a password protection program (such as a user password provided by Microsoft operating system) is added into the operating system, so that after the computer starts booting the operating system, executes the password protection program, and requests a user to enter a password, the password protection program requires a receipt of a correct password before permitting a user to logon the operating system or a decoding/encoding program of the operating system to access data in the hard disk. If the password protection program has not received a correct password, the user will not be able to logon the operating system or access data in the hard disk, so as to achieve the effect of protecting data in the hard disk.

However, an unauthorized person can install a stolen hard disk to another computer and use another hard disk of such computer to start another operating system, and then use a recovery tool or a hacker tool to enter into the hard disk of the stolen computer and access data in the hard disk of the stolen computer. Therefore, a hard disk of this type does not have any protection measure at all, and the data in the hard disk of the stolen computer can be accessed by a thief or an unauthorized person. In other words, the present hard disks do not have good data protection.

SUMMARY OF THE INVENTION

In view of the foregoing shortcomings of the prior art, the inventor of the present invention based on years of experience in the related industry to conduct extensive researches and experiments, and finally developed a method of protecting data for a hard disk in accordance with the present invention.

It is a primary objective of the present invention to provide a method for protecting data in a hard disk, such that if a computer at the stage of performing a power-on self test (POST) discovers that a protection description data is added to the hard disk, and a computer ID code of the computer matches with a specific part of the content of the protection description data, then a disk partition table in a disk partition of the hard disk will be created and available for the computer to read. After the power-on self test (POST) is completed, the computer completes booting the operating system and allows users to access the hard disk. If the computer ID code computer does not match with a specific part of the content of the protection description data, the disk partition of the hard disk will be cleared, and thus the computer will be unable to read any disk partition table. After the power-on self test (POST) is completed, the computer cannot boot the operating system and does not allow users to access data in the hard disk, so as to achieve the effect of protecting data in the hard disk.

To make it easier for our examiner to understand the objective, technical characteristics and effects of the present invention, preferred embodiment will be described with accompanying drawings as follows:

DETAILED DESCRIPTION OF THE PREFERRED EMBODIMENTS

Figure 1:
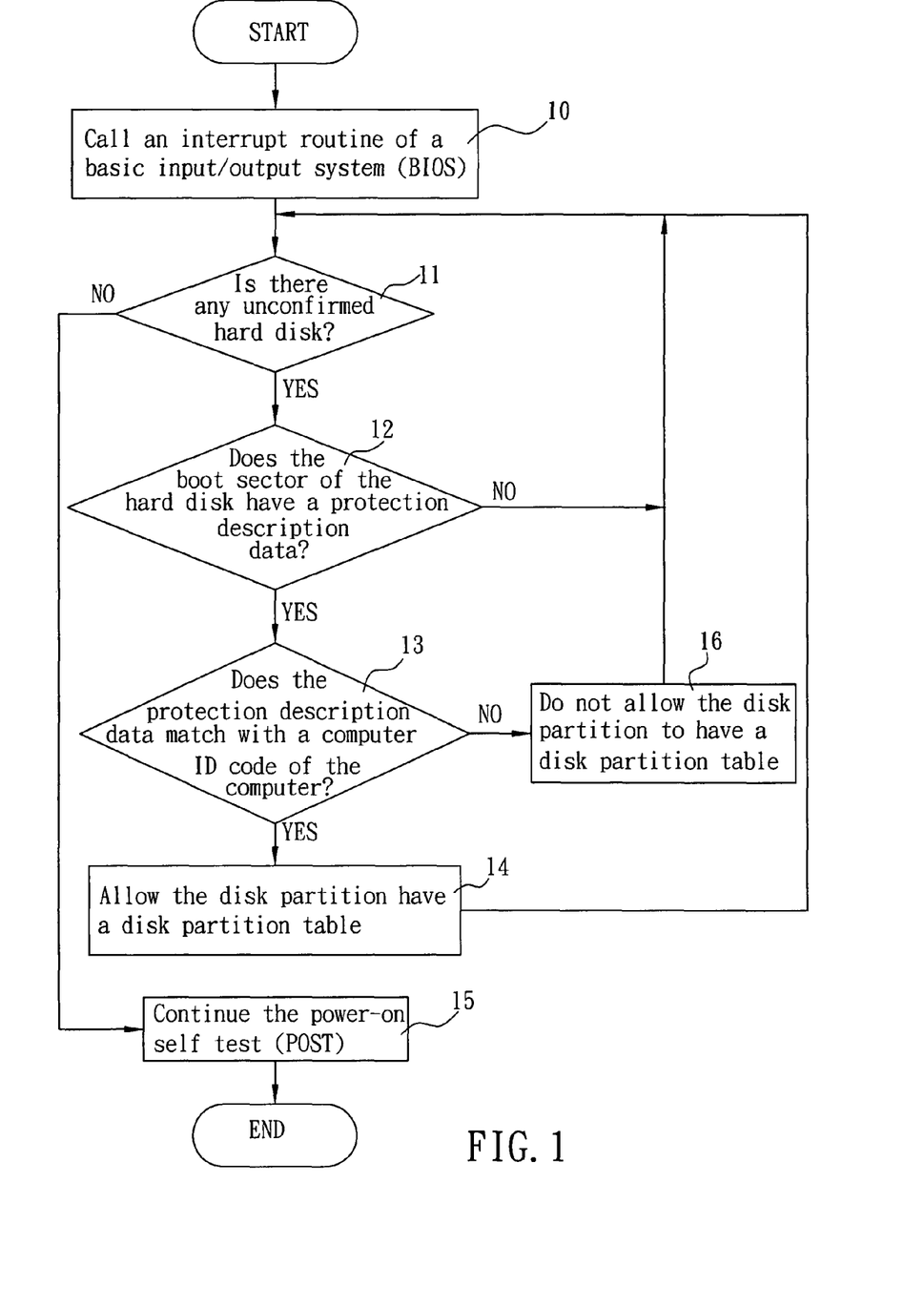
FIG. 1 is a flow chart of the present invention.
Figure 2:
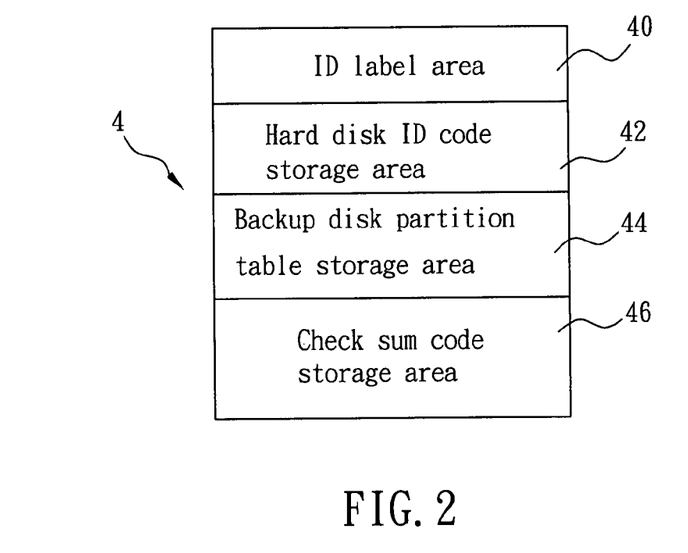
FIG. 2 shows a data structure of a protection description data.
Figure 3:
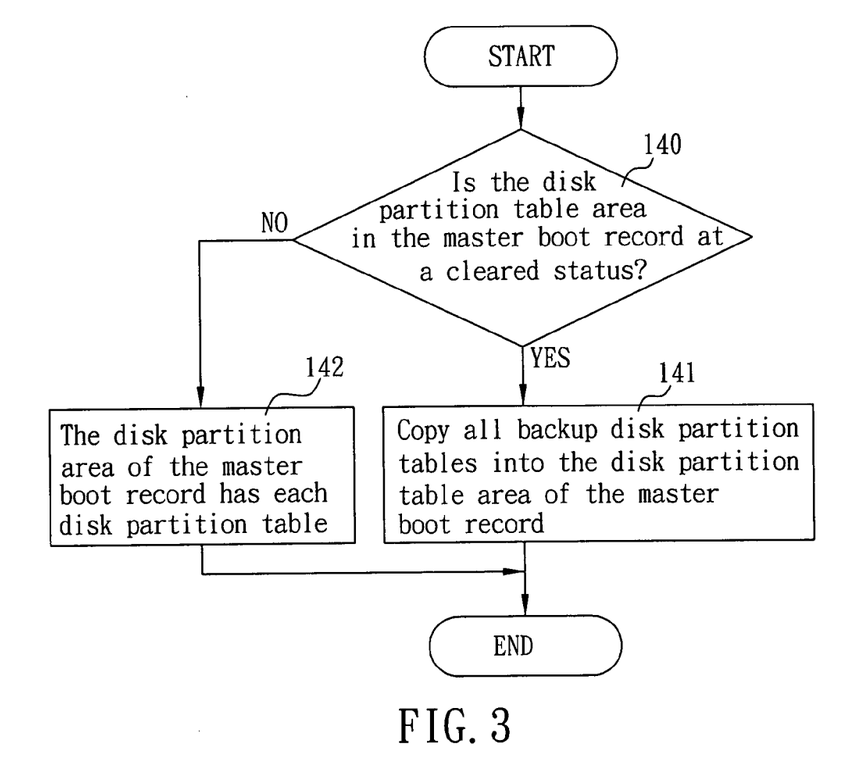
FIG. 3 is a flow chart of a computer storing a disk partition table in a partition table area in accordance with the present invention.
Figure 7:
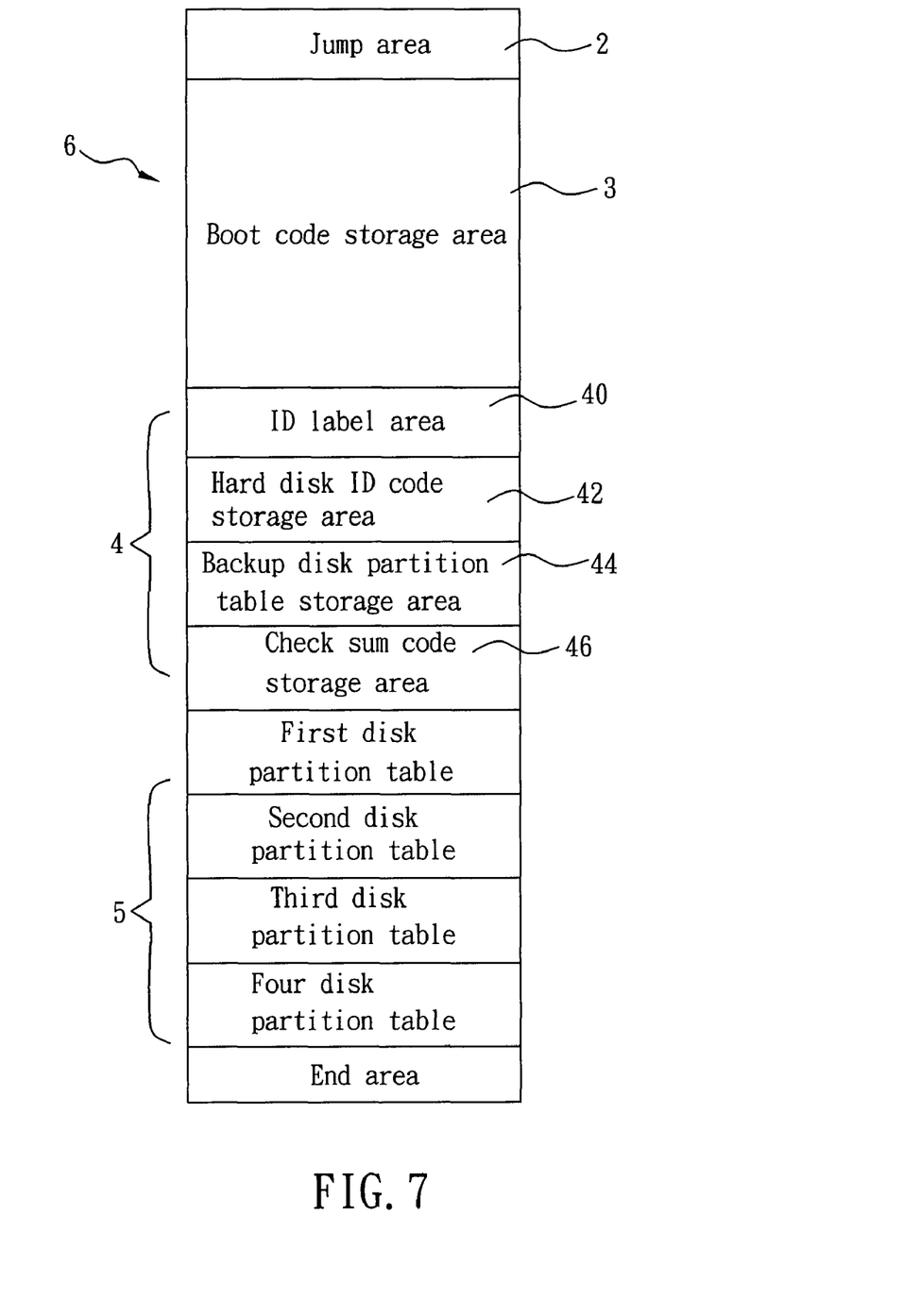
FIG. 7 is a schematic view of storing a protection description data in a master boot sector in accordance with a preferred embodiment of the present invention.
Figure 8:
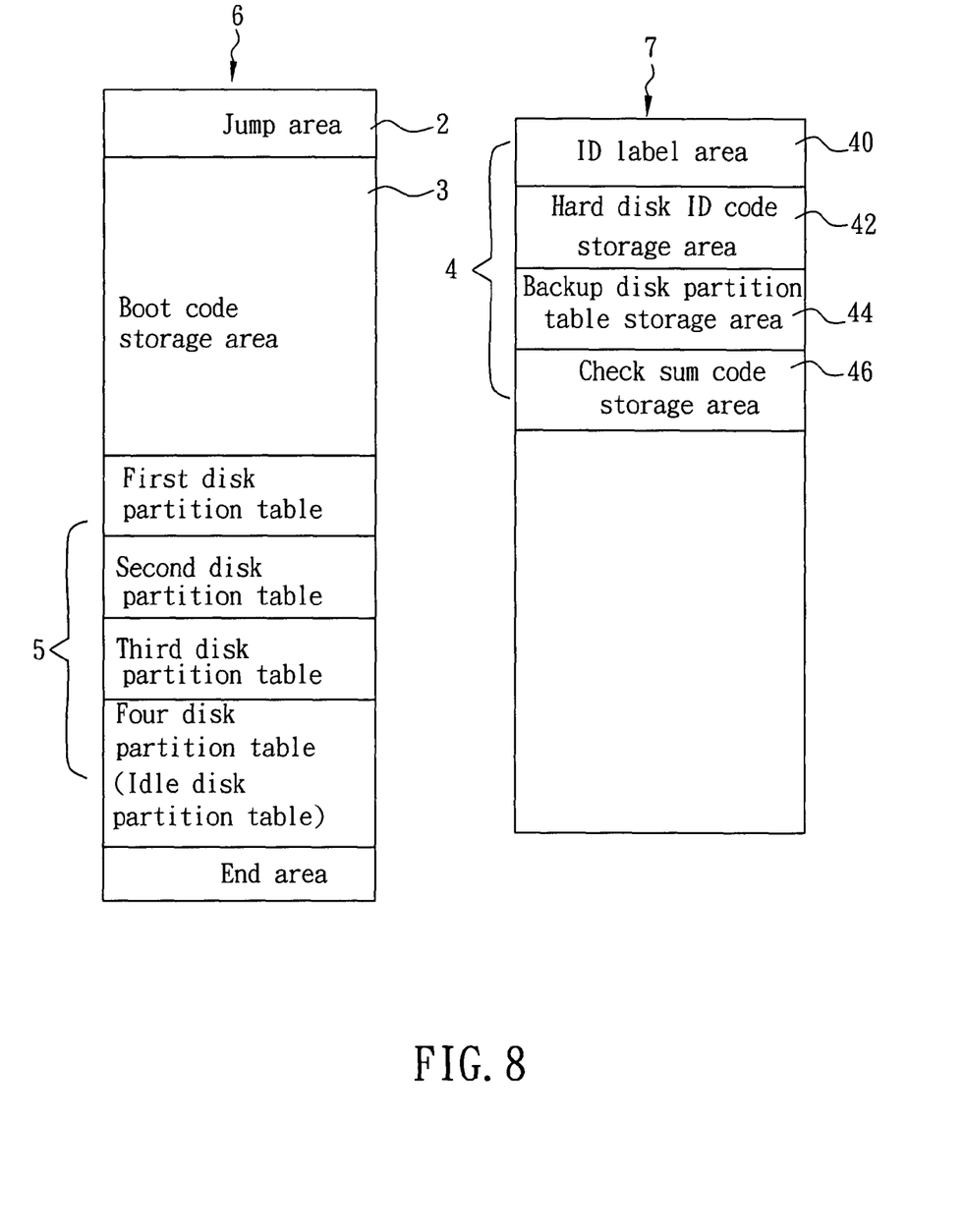
FIG. 8 is a schematic view of storing a protection description data in an idle sector and labeling a special type of idle disk partition table in accordance with the present invention.

Referring to FIG. 1 for a flow chart of a method for protecting data in a hard disk, the method is applied to a computer. If the computer is at a stage of executing a power-on self test (POST) of a basic input/output system (BIOS) and the initialization of memories is completed, and all initialization program codes of interface devices of all hard disks installed in the computer are executed, then the following steps will be carried out:

(10) calling an interrupt routine of the basic input/output system (BIOS) to read all hard disks;

(11) determining whether or not there is still any unconfirmed hard disk; if yes, then go to Step (12), or else go to Step (15);

(12) reading one of the unconfirmed hard disks, and determining whether or not the hard disk has a protection description data 4; if yes, then go to Step (13), or else go to Step (11); wherein a data structure of the protection description data 4 of this embodiment as shown in FIG. 2 comprises an ID label area 40, a hard disk ID code storage area 42, a backup disk partition table storage area 44 and a check sum code storage area 46, and the data stored in the ID label area 40 is ID information indicating that the hard disk has the protection description data 4, and the hard disk ID code storage area 42 is provided for storing a hard disk ID code, and the hard disk ID code must be the same as the computer ID code of the computer whose hard disk is set to be protected, and the computer ID code is a universal unique identification (UUID) such as a value in the Type 1 universal unique identification (UUID) field of a system management basic input/output system (SMBIOS); in other words, the hard disk ID code is also a universal unique identification (UUID), and a backup disk partition table storage area 44 is provided for storing a backup disk partition table, and the content of the backup disk partition table is the same as the content of disk partition table stored in a partition table area 5 (as shown in FIGS. 7 and 8) of the master boot record of a desired protecting hard disk, and the check sum code storage area 46 is provided for storing the numeric value obtained by calculating the protection description data 4 by a checking program;

(13) determining whether or not the protection description data 4 has a same portion as the computer ID code of the computer; if yes, then go to Step (14), or else go to Step (16); in this embodiment, the step of determining whether or not the protection description data 4 has a same portion as the computer ID code of the computer refers to reading a hard disk ID code of the hard disk ID code storage area 42 and determining whether or not the hard disk ID code is the same as the computer ID code; since both hard disk ID code and computer ID code are universal unique identifications (UUID), and the hard disk ID code is the same as the computer ID code of the computer whose hard disk is set to be protected, therefore if the hard disk that is not set as protected is read by another computer, then the computer ID code of the other computer must be different from the hard disk ID code, and the protection description data 4 must be determined whether or not it has a portion that matches with a computer ID code of the computer and then the following steps are proceeded;

(14) letting a partition table area 5 store a disk partition table, and following Step (11) for the processing; the step of letting a partition table area 5 store a disk partition table in this embodiment as shown in FIG. 3 comprises the steps of:

(140) determining whether or not the partition table area 5 in the master boot record is in a cleared status; if yes, then go to Step (141), or else go to Step (142);

(141) copying the backup disk partition table of the backup disk partition table storage area 44 into the partition table area 5 of the master boot record and then using the backup disk partition table as a disk partition table, and ending the step;

(142) storing each master boot record in a disk partition table of the partition table area 5; and copying the disk partition table of the partition table area 5 into the backup disk partition table storage area 44 to back up the disk partition table, and calculating to obtain a new numeric value according to the checking program, and storing the new numeric value into a check sum code storage area 46, and ending the procedure.

Figure 4:
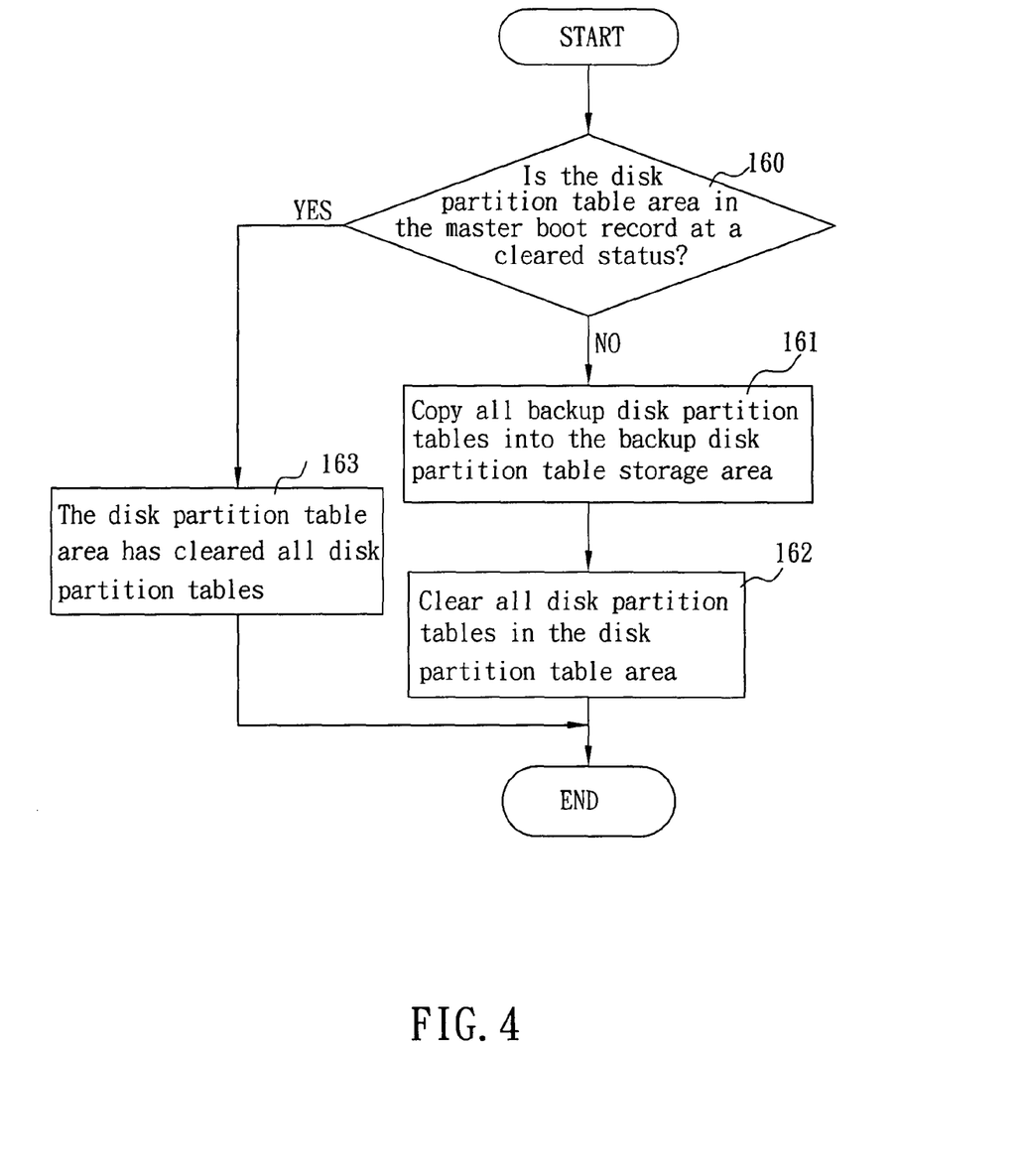
FIG. 4 is a flow chart of a computer that has no disk partition table stored in a partition table area in accordance with the present invention.

In this embodiment, the computer needs to reconfirm whether or not the partition table area 5 in the master boot record is in a cleared status, because the partition table area 5 of the hard disk may be cleared already in the previous reading. To avoid the computer from being unable to read any disk partition table in the partition table area 5, this step needs to reconfirm whether or not a partition table area 5 of the master boot record is in a cleared status;

(15) continuing the processing of a power-on self test (POST), and ending the step;

(16) maintaining no disk partition table existed in the partition table area 5, and carrying out Step (11); the procedure for the computer to process a method of maintaining no disk partition table in the partition table area 5 in accordance with the embodiment as shown in FIG. 4 comprises the steps of:

(160) determining whether or not the partition table area 5 in the master boot record is in a cleared status; if yes, then go to Step (163), or else go to Step (161);

(161) copying the disk partition table in the master boot record of the partition table area 5 to the backup disk partition table storage area 44 and using it as a backup disk partition table;

(162) clearing the disk partition table of the partition table area 5 in the master boot record, and ending the step;

(163) ending the procedure, when the partition table area 5 of the master boot record has cleared the disk partition table.

From the description above, the computer needs to reconfirm whether or not the partition table area 5 in the master boot record is in a cleared status. Since the hard disk is set to be read by a protected computer in the previous reading, therefore the partition table area 5 already has a disk partition table, and it is necessary to confirm that the disk partition table is cleared, so as to prevent the computer from reading the disk partition table. To prevent the disk partition table in the partition table area 5 from being different from the backup disk partition table, it is necessary to copy the disk partition table to the backup disk partition table storage area 44 before the disk partition table is cleared; after the computer of this embodiment reads the disk partition table in the partition table area 5 of the hard disk, the numeric values are computed and obtained by a checking program and stored in a check sum code storage area 46, and then Step (11) is carried out.

From the description above, a disk partition table is created in the partition table area 5 of the hard disk if the hard disk ID code of the hard disk is the same as the computer ID code, so that the computer can read the disk partition table. After the power-on self test (POST) is completed, the operating system can be started, or else the partition table area 5 of the hard disk will be cleared. If a computer cannot start the operating system after the power-on self test (POST) is completed, the computer will not be able to read the hard disk.

Figure 5:
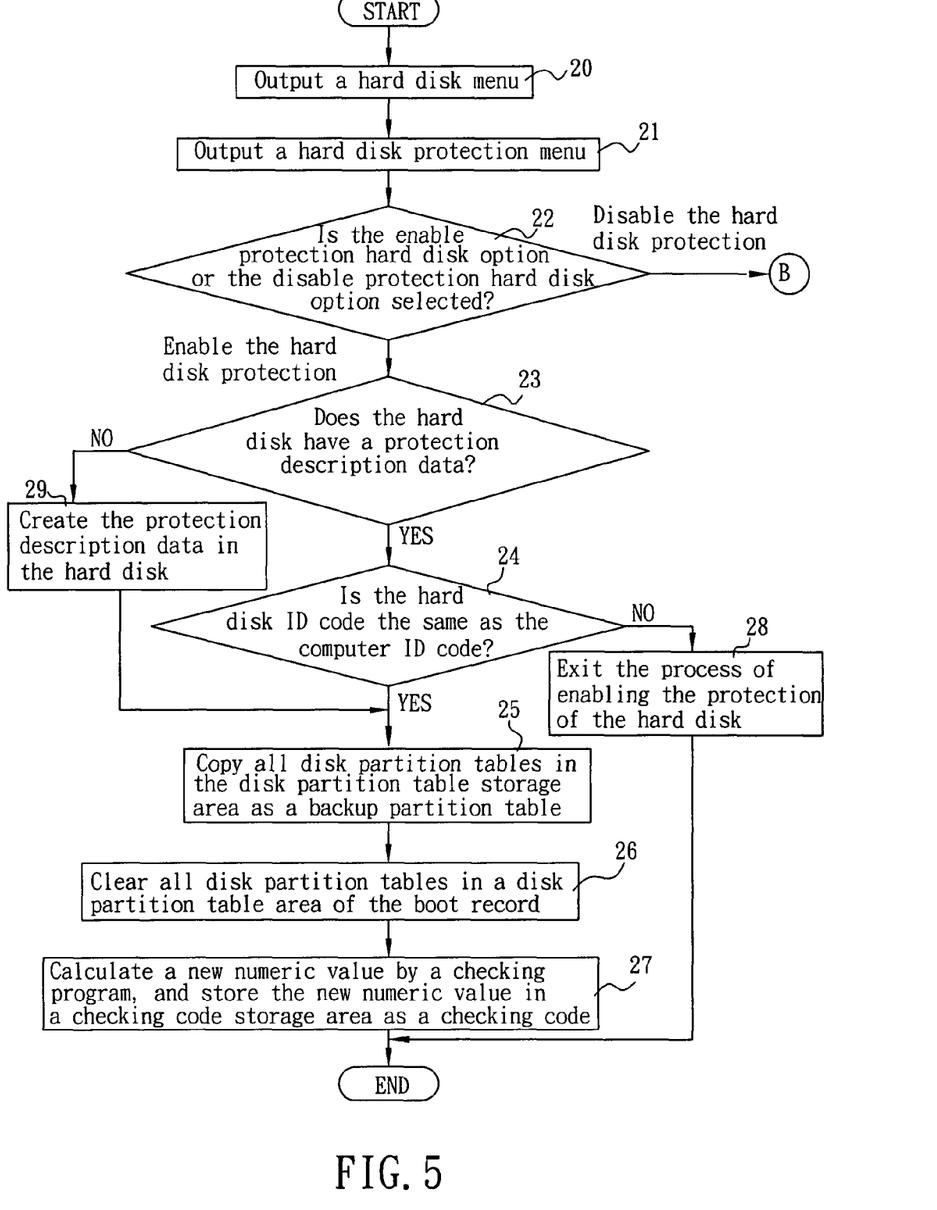
FIG. 5 is a flow chart of a computer writing a protection description data in a hard disk to set the protection for the hard disk in accordance with the present invention.
Figure 6:
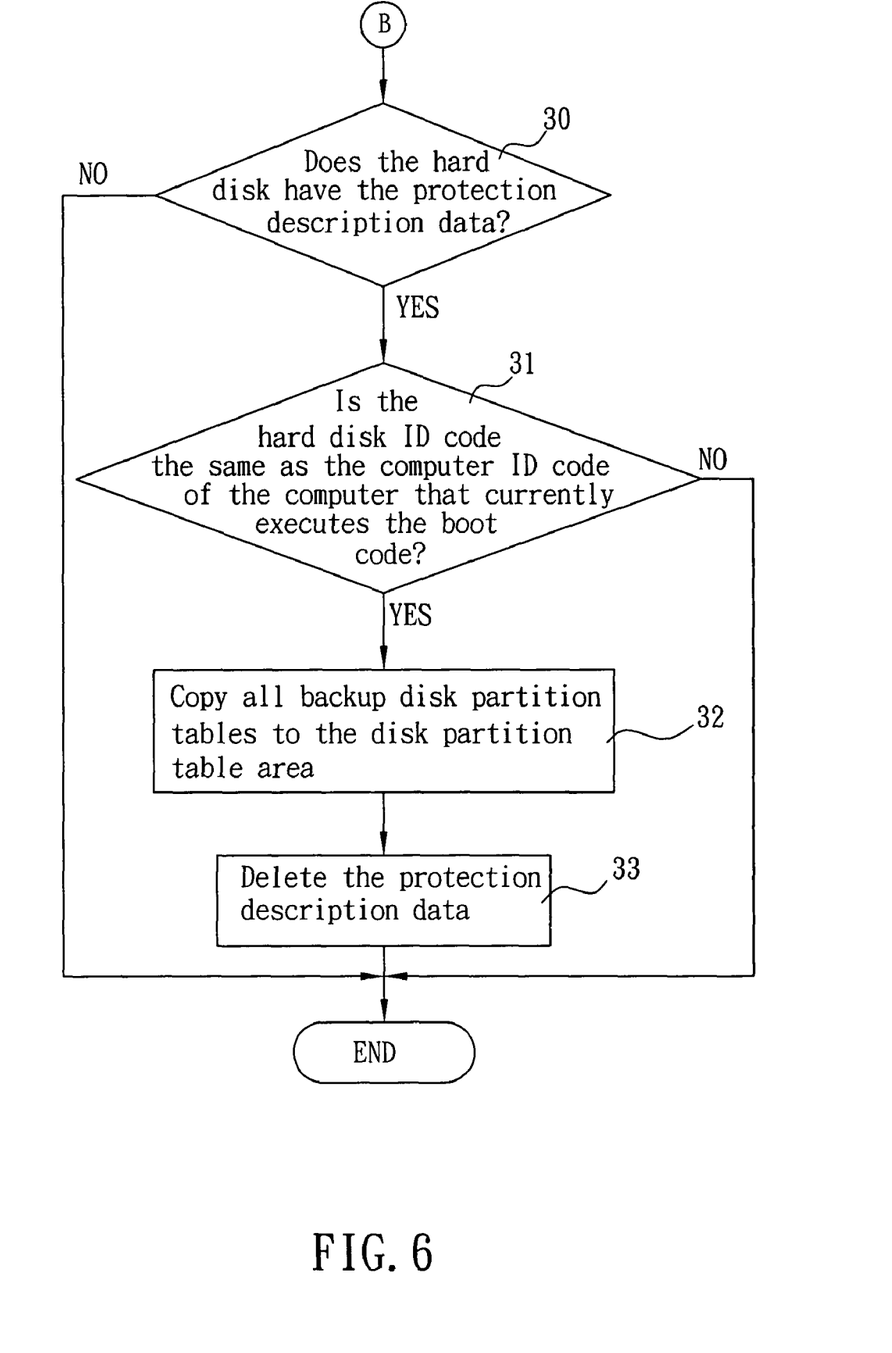
FIG. 6 is a flow chart of a computer cancelling the protection of a hard disk in accordance with the present invention.

In this preferred embodiment as shown in FIG. 5, the step for the computer to write the protection description data 4 into the hard disk for setting or cancelling the hard disk to be protected as shown in FIGS. 5 and 6 comprises:

(20) outputting a hard disk menu for a user to select one of the hard disks, wherein the hard disk menu includes all hard disks installed in the computer, and then carrying out the following steps;

(21) outputting a hard disk protection menu after the user selects a hard disk, wherein the hard disk protection menu includes an enable protection hard disk option and a disable protection hard disk option;

(22) determining whether the enable protection hard disk option or the disable protection hard disk option is selected; if the enable protection hard disk option is selected, then go to Step (23), or else the disable protection hard disk option is selected, and go to Step (30);

(23) determining whether the hard disk already has the protection description data 4 when the enable protection hard disk option is selected; if yes, then go to Step (24), or else go to Step (29); and in the present invention, the method of determining whether or not the hard disk already has the protection description data 4 is to determine whether or not the data stored in the ID label area 40 is read;

(24) determining whether or not the hard disk ID code is the same as the computer ID code; if yes, then go to Step (25), or else go to Step (28);

(25) copying disk partition table in the partition table area 5 of the master boot record to the backup disk partition table storage area 44 as a backup disk partition table;

(26) clearing the disk partition table in the partition table area 5 of the master boot record;

(27) executing the checking program to obtain a new numeric value according to the contents of the ID label area 40, hard disk ID code storage area 42, and backup disk partition table storage area 44, and storing the new numeric value into the check sum code storage area 46 as a check sum code, and ending the step;

(28) exiting the process of starting the protection of the hard disk, and ending the step;

(29) creating the protection description data 4 in the hard disk, and carrying out Step (25);

(30) determining whether or not the hard disk already has the protection description data 4, when the disable protection hard disk option is selected; if yes, go to Step (31), or else end the step; wherein the method used in this step for determining whether or not the hard disk is protected is to determine whether or not the data stored in the ID label area 40 is read;

(31) determining whether or not the hard disk ID code is the same as the computer ID code of the computer that currently executes the boot code; if yes, then go to Step (32), or else end the step;

(32) copying the backup disk partition table in the backup disk partition table storage area 44 to the partition table area 5 to recover the disk partition table in the partition table area 5;

(33) deleting the protection description data 4, and ending the procedure.

From the description above, the master boot record remains unchanged if the protection of the hard disk is not enabled. In other words, the master boot record has not created a protection description data 4, and it directly continues reading the master boot record to complete the process of starting the operating system. If the protection of the hard disk is enabled, the master boot record has created the protection description data 4. By reading the protection description data 4 through the hard disk, it indicates that the hard disk is protected; and by determining whether or not the hard disk ID code is the same as the computer ID code, the current computer that reads the hard disk is set as the computer having such hard disk ID code; if yes, then it indicates that the hard disk is not stolen or installed to other computer for reading the hard disk, so as to achieve the effect of protecting the data in the hard disk.

In this preferred embodiment, the protection description data 4 is stored in an unused storage space between the jump area 2 of the master boot record of the master boot sector 6 of the hard disk and the partition table area 5 (as shown in FIG. 7), which is also the boot code storage area 3 of the boot code. The computer searches an ID information in an unused space between the jump area 2 of the master boot record and the partition table area 5 to determine whether or not the hard disk has a protection description data 4. Since the hard disk ID code storage area 42, backup disk partition table storage area 44 and check sum code storage area 46 come with a fixed storage capacity, therefore after the computer reads the ID information, the ID information can be used for calculating the start addresses of the hard disk ID code storage area 42, backup disk partition table storage area 44 and check sum code storage area 46 in the master boot sector, so that the computer reads the numeric values of the hard disk ID code, each backup disk partition table and check sum code according to the start addresses of the hard disk ID code storage area 42, backup disk partition table storage area 44 and check sum code storage area 46 in the master boot sector.

Since the boot code storage area 3 of the master boot sector 6 of the hard disk may not be large enough to store the protection description data 4, therefore the computer of another preferred embodiment of the present invention writes the protection description data 4a in one of the idle sectors 7 of the partition table area 5 of the hard disk and labels the idle disk partition table in the partition table area 5 as a special type, and writes in the start position of an available sector in the idle disk partition table (as shown in FIG. 8). The computer searches an idle disk partition table labeled as a special type in the partition table area 5 of the hard disk to determine whether or not the hard disk has a protection description data 4 and obtains the start position of an available sector from the protection description data 4 of the idle disk partition table to read the ID information. Since the hard disk ID code storage area 42, backup disk partition table storage area 44 and check sum code storage area 46 come with a fixed storage capacity, therefore after the computer reads the ID information, the ID information can be used for calculating the start addresses of the hard disk ID code storage area 42, backup disk partition table storage area 44 and check sum code storage area 46 in the master boot sector, such that the computer can calculate the start addresses of an available sector according to the hard disk ID code storage area 42, backup disk partition table storage area 44 and check sum code storage area 46 and reads the numeric values of the hard disk ID code, each backup disk partition table and check sum code.

While the invention herein disclosed has been described by means of specific embodiments, numerous modifications and variations could be made thereto by those skilled in the art without departing from the scope and spirit of the invention set forth in the claims.

What is claimed is:

1. A method for protecting data in a hard disk, which is applied to a computer after said computer executes a power-on self test (POST) of a basic input/output system (BIOS), completes the initialization of memories and executes initialization program codes for interface devices of all hard disks installed in said computer, said method comprises:

calling an interrupt routine of said basic input/output system (BIOS), for reading said hard disks;

determining whether or not there is an unconfirmed hard disk; when there is an unconfirmed hard disk, reading said unconfirmed hard disk and determining whether or not said unconfirmed hard disk has a protection description data, wherein said protection description data comprises an ID label area for storing an ID information indicating that said hard disk has said protection description data, a hard disk ID code storage area for storing a hard disk ID code same as a computer ID code of said computer who sets said hard disk to be protected, a backup disk partition table storage area for storing a backup disk partition table of which the content is the same as the content of said disk partition table stored in said partition table area of a master boot record (MBR) in said hard disk that requires a protection, and a check sum code storage area for storing a numeric value of said protection description data that is computed by a checking program;

determining whether or not said protection description data has a portion same as said computer ID code of said computer when said unconfirmed hard disk is determined to have said protection description data;

creating a disk partition table in a partition table area in said unconfirmed hard disk when said protection description data is determined to have a portion same as said computer ID code of said computer; and repeating said step of determining whether or not there is other unconfirmed hard disk, and continuing the processing of said power-on self test (POST) after all of said hard disks are confirmed, and then ending the procedure.

2. The method of claim 1, wherein said step of creating said disk partition table in said partition table area comprises;

determining whether or not said partition table area in said master boot record is in a cleared status; and copying said backup disk partition table in said backup disk partition table storage area to said partition table area in said master boot record as said disk partition table, when said partition table area in said master boot record is determined to be in a cleared status.

3. The method of claim 2, wherein when said partition table area in said master boot record is determined to be not in a cleared status, said disk partition table is existed in said partition table area of said master boot record for being read by said computer, further comprising:

copying said disk partition table of said partition table area to said backup disk partition table storage area to back up updated disk partition table, and calculating a new numeric value according to said checking program, and storing said new numeric value into said check sum code storage area.

4. The method of claim 1, wherein when no disk partition table is existed in said partition table area in said hard disk, further comprising: determining whether or not said partition table area in said master boot record is in a cleared status;

copying said disk partition table in said partition table area of said master boot record to said backup disk partition table storage area and using said disk partition table as said backup disk partition table, when said partition table area in said master boot record is determined to be not in a cleared status; and clearing said disk partition table in said partition table area of said master boot record.

5. The method of claim 4, wherein said hard disk cannot be accessed, when said partition table area in said master boot record is determined to be in a cleared status and said disk partition table in said partition table area of said master boot record has been cleared.

6. The method of claim 1, wherein said step for said computer to write said protection description data into said hard disk for setting or cancelling said hard disk to be protected comprises:

outputting a hard disk menu for user to select one of said hard disks, and said hard disk menu includes said hard disks installed in said computer;

outputting a hard disk protection menu after the user selects one of said hard disks, wherein said hard disk protection menu includes an enable protection hard disk option and a disable protection hard disk option;

determining whether said enable protection hard disk option or said disable protection hard disk option is selected;

determining whether or not said hard disk already has said protection description data, when said enable protection hard disk option is selected;

determining whether or not said hard disk ID code is the same as said computer ID code, when said hard disk is determined to have said protection description data;

copying said disk partition table in said partition table area of said master boot record to said backup disk partition table storage area as said backup disk partition table, when said hard disk ID code is determined to be the same as said computer ID code;

clearing said disk partition table in said partition table area of said master boot record; and calculating to obtain a new numeric value by said checking program, and storing said new numeric value into said check sum code storage area of said hard disk as said check sum code.

7. The method of claim 6, further comprising:

exiting the process of starting to protect said hard disk, when said hard disk ID code is determined to be not the same as said computer ID code.

8. The method of claim 6, wherein said step for said hard disk to create said protection description data and copy said disk partition table in said partition table area of said master boot record to said backup disk partition table storage area as said backup disk partition table is proceeded, when said hard disk is determined to not have said protection description data.

9. The method of claim 6, after said disable protection hard disk option is selected, further comprising determining whether or not said hard disk already has said protection description data;

determining whether or not said hard disk ID code is the same as said computer ID code of said computer that currently executes a boot code, when said hard disk is determined to have said protection description data;

copying said backup disk partition table to said partition table area, when said hard disk ID code is determined to be the same as said computer ID code of said computer that currently executes said boot code; and deleting said protection description data.

10. The method of claim 9, further comprising:

exiting the process of cancelling the protection of said hard disk, when said hard disk is determined to have said protection description data and said hard disk ID code is determined to be not the same as said computer ID code of a computer that currently executes said boot code.

11. The method of claim 9, further comprising:

exiting the process of cancelling the protection of said hard disk, when said hard disk is determined to not have said protection description data.

12. The method of claim 1, wherein said protection description data is stored in an unused space between a MBR boot code area of said master boot record and said disk partition table.

13. The method of claim 12, wherein said computer searches for an ID information existed in said unused space between a jump area of said master boot record and said partition table area to determine whether or not said hard disk already has said protection description data.

14. The method of claim 13, wherein said hard disk ID code storage area, backup disk partition table storage area and check sum code storage area come with a fixed storage capacity, such that after said computer reads said ID information, said ID information is used for calculating the start addresses of said hard disk ID code storage area, said backup disk partition table storage area and said check sum code storage area in said master boot record, such that said computer can read the numeric value of said hard disk ID code, said backup disk partition table and said check sum code according to the start addresses of said hard disk ID code storage area, said backup disk partition table storage area and said check sum code storage area in said master boot record.

15. The method of claim 1, wherein said computer writes said protection description data in one of the available sectors in said partition table area of said hard disk and labeling one of idle disk partition tables in said partition table area as a special type, and writes a start position of said available sector in said idle disk partition table.

16. The method of claim 15, wherein said computer searches for said idle disk partition table labeled as said special type according to said partition table area of said hard disk to determine whether or not said hard disk has said protection description data, and obtains a start position of said available sector in said protection description data form said idle disk partition table to read said ID information.

17. The method of claim 16, wherein said ID information is used for calculating the start addresses of said hard disk ID code storage area, said backup disk partition table storage area and said check sum code storage area in said master boot record after said computer reads said ID information, such that said computer reads the numeric values of said hard disk ID code, said backup disk partition table and said check sum code according to the start addresses of said hard disk ID code storage area, said backup disk partition table storage area and said check sum code storage area in said available sector.

* * * * *